United States Patent
Sato et al.

(10) Patent No.: US 8,804,017 B2
(45) Date of Patent: Aug. 12, 2014

(54) SOLID-STATE IMAGING DEVICE (75) Inventors: Maki Sato, Yamato (JP); Kazuhide Sugiura, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 660 days.

(21) Appl. No.: 13/052,213

(22) Filed: Mar. 21, 2011

(65) Prior Publication Data
US 2011/0234867 A1    Sep. 29, 2011

(30) Foreign Application Priority Data

Mar. 24, 2010    (JP) ................................ 2010-068434

(51) Int. Cl.
*H04N 5/335* (2011.01)
*H04N 5/217* (2011.01)
*H04N 9/64* (2006.01)

(52) U.S. Cl.
USPC ........... 348/294; 348/241; 348/243; 348/245; 348/302

(58) Field of Classification Search
USPC .............. 348/222.1, 241, 243, 245, 251, 252, 348/266, 272, 281, 282, 283, 294, 295, 296, 348/297, 298, 299, 300, 301, 302, 303, 304, 348/305, 306, 307, 308, 309, 310, 311, 312, 348/313, 314, 315, 316, 317, 318, 319, 320, 348/321, 322, 323, 324

See application file for complete search history.

(56) References Cited

U.S. PATENT DOCUMENTS

| | | | |
|---|---|---|---|
| 6,803,958 B1 | 10/2004 | Wang | |
| 2009/0051801 A1* | 2/2009 | Mishina et al. | ............... 348/311 |
| 2009/0284634 A1* | 11/2009 | Tsukimura | ..................... 348/308 |
| 2010/0039543 A1* | 2/2010 | Muroshima et al. | .......... 348/300 |
| 2011/0141324 A1* | 6/2011 | Koseki | ........................... 348/241 |
| 2011/0248149 A1* | 10/2011 | Sato et al. | .................. 250/214 P |

FOREIGN PATENT DOCUMENTS

| | | |
|---|---|---|
| JP | 2000-287131 A | 10/2000 |
| JP | 2003-259219 A | 9/2003 |
| JP | 2006-157242 A | 6/2006 |
| JP | 2007-196033 A | 8/2007 |
| JP | 2007-243266 A | 9/2007 |
| JP | 2008-167004 | 7/2008 |
| JP | 2008-187420 A | 8/2008 |
| JP | 2008-283557 A | 11/2008 |

OTHER PUBLICATIONS

Japanese Office Action Issued Jul. 3, 2012 in Patent Application No. 2010-066434 with English Translation.

* cited by examiner

*Primary Examiner* — Twyler Haskins
*Assistant Examiner* — Peter Chon
(74) *Attorney, Agent, or Firm* — Oblon, Spivak, McClelland, Maier & Neustadt, L.L.P.

(57) ABSTRACT

According to one embodiment, a solid-state imaging device includes a VOB region, an effective pixel region, a comparator, a holder, and a drive controller. The effective pixel region outputs the reset signal, and an image signal to the vertical signal line. The comparator compares the reset signal transferred from the VOB region through the vertical signal line with a reference signal, and determining whether the reset signal is within a digital level range. The holder is capable of holding either a value representing a first result or a value representing a second result, according to a determination result of the comparator. The drive controller varies a pulse timing period according to the value held by the holder, and automatically sets the period when the reset signal is read from the effective pixel region to the vertical signal line. A voltage of the vertical signal line is clamped in the period.

6 Claims, 9 Drawing Sheets

SOLID-STATE IMAGING DEVICE

CROSS-REFERENCE TO RELATED APPLICATIONS

This application is based upon and claims the benefit of priority from Japanese Patent Application No. 2010-068434, filed Mar. 24, 2010; the entire contents of which are incorporated herein by reference.

FIELD

Embodiments described herein relate generally to a solid-state imaging device applied to an image sensor, for example.

BACKGROUND

U.S. Pat. No. 6,803,958 discloses that, when performing photoelectric conversion to light incident from a photodiode thereby converting an obtained analog signal to a digital signal in an image sensor circuit, it is required to remove noise from an image signal.

However, when converting to the digital signal, there is a problem that digital conversion is not performed to a reset signal, which is a reference voltage of the image signal out of the analog signal, due to magnitude of a gain of a reference signal, and an entirely black and dark image is obtained.

DETAILED DESCRIPTION

Hereinafter, first and second embodiments will be described with reference to the drawings. In this description, common reference numerals are assigned to common parts throughout the drawings.

In general, according to one embodiment, a solid-state imaging device includes a VOB region, an effective pixel region, a comparator, a holder, and a drive controller. The effective pixel region outputs the reset signal, used as a reference level of an image signal, and the image signal to the vertical signal line. The comparator compares the reset signal transferred from the VOB region through the vertical signal line with a reference signal, and determining whether the reset signal is within a digital level range. The holder is capable of holding either a value representing a first result or a value representing a second result, according to a determination result of the comparator. The drive controller varies a period according to the value held by the holder, and automatically sets the period when the reset signal is read from the effective pixel region to the vertical signal line. A voltage of the vertical signal line is clamped in the period.

First Embodiment

A solid-state imaging device according to this embodiment will be described with reference to FIGS. 1 to 5. The solid-state imaging device according to this embodiment is configured to automatically set a period to clamp a voltage of a vertical signal line VSL (to fix at a voltage larger than a reset voltage) in accordance with whether reset signals read from the unit pixels 3 of a VOP are within the digital level range, when the reset signal is read from a unit pixel provided in an effective imaging region and to inhibit a vertical line on a display screen, for example, thereby especially improving dark time properties.

<1. Configuration Example>

Figure 1:
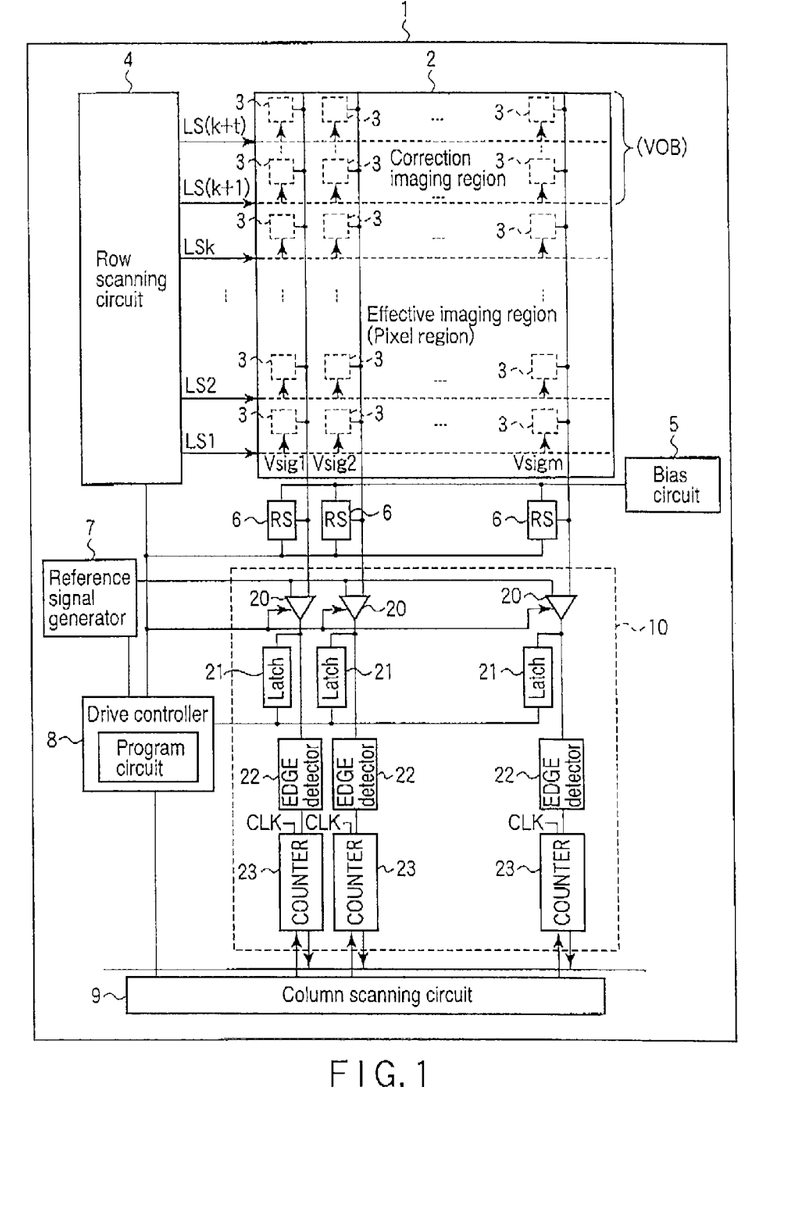
FIG. 1 is a block diagram of a solid-state imaging device according to a first embodiment.

A configuration example of a solid-state imaging device 1 according to this embodiment will be first described with reference to FIG. 1. FIG. 1 is a block diagram of the solid-state imaging device 1 according to this embodiment. As illustrated in FIG. 1, the solid-state imaging device 1 includes an imaging unit 2, a row scanning circuit 4, a bias circuit 5, a reset signal controller 6 (indicated as RS in the drawing), a reference signal generator 7, a drive controller 8, a column scanning circuit 9, and a column analog-to-digital convertor 10 (hereinafter, referred to as an ADC unit 10).

<Imaging Unit 2>

The imaging unit 2 will be first described. The imaging unit 2 includes a correction imaging region (hereinafter, also referred to as a VOB region) and the effective imaging region.

The effective imaging region includes a plurality of unit pixels 3 (hereinafter, also referred to as a PIXEL 3) arranged in a k×m matrix pattern. The VOB (correction imaging) region includes a plurality of unit pixels 3 arranged in a t×m matrix pattern and is a light-shielded region. Also, the unit pixels 3 arranged in the effective imaging region and the VOB region have the same configuration.

Analog signals Vsig (signals Vsig1 to Vsigm in the drawing) corresponding to an amount of incident light are output from the unit pixels 3 of a row selected by the row scanning circuit 4 for each vertical signal line VSL (VSL1 to VSLm in the drawing). Meanwhile, when the analog signals Vsig1 to Vsigm are not distinguished from each other, they are simply referred to as the analog signals Vsig. Further, when the vertical signal lines VSL1 to VSLm are not distinguished from each other, they are simply referred to as the vertical signal lines VSL.

<Row Scanning Circuit 4>

The row scanning circuit 4 serves as a selector, which outputs signals LS(k+t) to LS(k+1) and signals LSk to LS1 to the imaging unit 2 to select the unit pixels 3 for each row by a control signal from the drive controller 8. Meanwhile, when signals LS1 to LSk and signals LS(k+1) to LS(k+t) are not distinguished from each other, they are simply referred to as signals LS. Signals LS are a signal RESET and a signal READ, for example. That is, when the row scanning circuit 4 outputs signal LS to the pixel 3, the reset signal and an image signal are read by reading operation from the pixel 3. Meanwhile, in this embodiment, the reset signal and the image signal or only the reset signal is read at the pixel 3 in the correction imaging region (VOB) to the vertical signal line VSL.

<Bias Circuit 5>

The bias circuit 5 supplies a predetermined voltage to the reset signal controller 6.

<Reset Signal Controller 6>

The reset signal controller 6 switches a period (hereinafter, also referred to as sensor timing) to clamp (fix) the vertical signal line VSL at a predetermined voltage according to signal clamp enable (hereinafter, referred to as signal CE) supplied from the drive controller 8. That is, the reset signal controller 6 includes an MOS transistor, which is turned on when signal CE applied to a gate is made high to supply a clamp voltage to the vertical signal line VSL.

The period in which the reset signal controller 6 clamps the vertical signal line VSL at the predetermined voltage is any of an auto-zero period in which a reference voltage of a pixel signal of the pixel 3 in the effective pixel region is set or both of the auto-zero period and a period in which the reset signal is read from the pixel 3 (hereinafter, referred to as a reset signal detection period).

Also, the predetermined voltage is supplied from the bias circuit 5 to the reset signal controller 6. Meanwhile, the voltage at which the reset signal controller 6 clamps the vertical signal line VSL is a value at least larger than that of the reset signal read from the pixel 3 in the effective imaging region. This is for preventing the reset signal read from the pixel 3 from decreasing when incident light is too much. In other words, when the reset signal decreases, sufficient dynamic range of the pixel signal and the reference potential of the pixel signal obtained in the auto-zero period is not obtained. Therefore, a black and dark pattern is generated in an entire obtained image. In order to prevent this phenomenon, the potential of the vertical signal line VSL is clamped.

<Reference Signal Generating Unit 7>

The reference signal generator 7 outputs a reference signal VREF to the ADC unit 10 based on the control signal supplied from the drive controller 8. The reference signal generator 7 outputs the reference signal VREF as first to third reference signals according to periods (hereinafter, the auto-zero period, reset signal detection period and pixel signal detection period). The reference signals decrease at a constant inclination from a high-level voltage to a low-level voltage.

The first reference signal VREF1 is output to the ADC unit 10 (comparator 20) in the auto-zero period for setting the reference voltage of the reset signal and the image signal.

Then, the second reference signal VREF2 is output to the ADC unit 10 (comparator 20) in the reset signal detection period for performing digital conversion to the reset signal read from the pixel 3.

Further, the third reference signal VREF3 is output to the ADC unit 10 (comparator 20) in an image signal detection period for performing the digital conversion to the pixel signal read from the pixel 3. Meanwhile, when the reference signals VREF1 to VREF3 are not distinguished from each other, they are simply referred to as the reference signals VREF.

<Drive Controller 8>

The drive controller 8 supplies signal CE to the reset signal controller 6 according to a determination flag supplied from a latch circuit 21. That is, the drive controller 8 supplies signal CE to the reset signal controller 6 according to whether a digital value may be obtained from the reset signal read from the pixel 3 in the VOB. Signal CE is a control signal for setting the period in which the vertical signal line VSL is clamped at the predetermined potential (auto-zero period or any of auto-zero period and reset signal detection period) when reading the reset signal from the pixel 3 in the effective imaging region to the vertical signal line VSL as described above.

In this embodiment, signal CE is made high only in the auto-zero period when the determination flag is low, and signal CE is made high in the auto-zero period and the reset signal detection period when the determination flag is high.

Meanwhile, although the above-described determination flag may be determined using one pixel 3 in this embodiment, it is preferable to use a plurality of unit pixels 3 as far as possible. This is because, if clamp enable signal pulse timing is changed when it is determined that a level of the reset signal does not fall within an AD range by one determination flag, there might be a case in which a pixel with a white defect in a node N1 is detected in error when an analog gain is low.

Then, since there is a plurality of (t×m) unit pixels 3 in the VOB, the period in which signal CE is made high is changed according to the number of unit pixels 3 in which the determination flag is set by an analog-to-digital conversion result of the reset signal obtained from the unit pixels 3 in the VOB.

That is, by mounting a program circuit for determining the number on the drive controller 8, the sensor timing optimal for the analog gain may be transmitted in an effective pixel reading period with a high degree of accuracy.

The drive controller 8 controls timing at which the reset signal controller 6 clamps the voltage of the vertical signal line VSL at a predetermined voltage.

<Column Scanning Circuit 9>

The column scanning circuit 9 supplies a digital signal supplied from the ADC circuit 10 to an image processor (not illustrated) and the like, for example.

<ADC Unit 10>

The ADC unit 10 includes the comparator 20, the latch circuit 21, an EDGE detector 22, and a COUNTER 23 (hereinafter, referred to as a counter 23), and the digital conversion of the reset signal and the pixel signal read from the pixel 3 is performed by this configuration.

The comparator 20 will be first described. The comparator 20 compares the analog signal Vsig (reset signal or pixel signal) transferred from the unit pixels 3 in the correction imaging region (VOB) and the effective imaging region with the reference signal VREF. The comparator 20 outputs a value corresponding to a comparison result (high or low). Specifically, the comparator 20 inputs a value of the reference signal VREF to a positive input terminal and inputs the potential of the vertical signal line VSL to an inverting input terminal. That is, the comparator 20 output goes high when the value of the reference signal VREF is larger than the potential of the vertical signal line VSL, and goes low in the opposite case.

Next, the latch circuit 21 will be described. The latch circuit 21 holds a logical high or a logical low according to data whether the comparator 20 is inverted with respect to the reset signal. Specifically, if an analog-to-digital conversion level of the reset signal read from the pixel 3 in the VOB region, that is to say, a reset count reaches a full count range while being made high, for example, the latch circuit 21 supplies a high latch signal (determination flag) to the drive controller 8, for example. Herein, a minimum unit when slicing a lamp wave of the reference signal VREF at 10-bit 1024 level is set to 1 LSB (1/1024), for example.

Next, the EDGE detector 22 detects a level (LSB) at which the comparison result of the analog signal Vsig (reset signal or pixel signal) with the reference signal VREF is inverted. That is, when the signal supplied from the comparator 20 goes low, the EDGE detector 22 supplies the detection result to the counter 23.

Finally, the counter 23 will be described. The counter 23 counts the digital value of the reset signal and (reset signal+image signal) until the detection result (high to low) supplied from the EDGE detector 22 is obtained. The counter 23 supplies difference between the digital value of the reset signal and the digital value of (pixel signal+reset signal) to the column scanning circuit 9 as the digital value of the pixel signal. In other words, the counter 23 outputs an amount of time with which magnitude relation between the pixel signal and the reference signal VREF3 is inverted to the column scanning circuit 9 as the digital value.

<2. Configuration Example of Unit Pixel 3>

Figure 2:
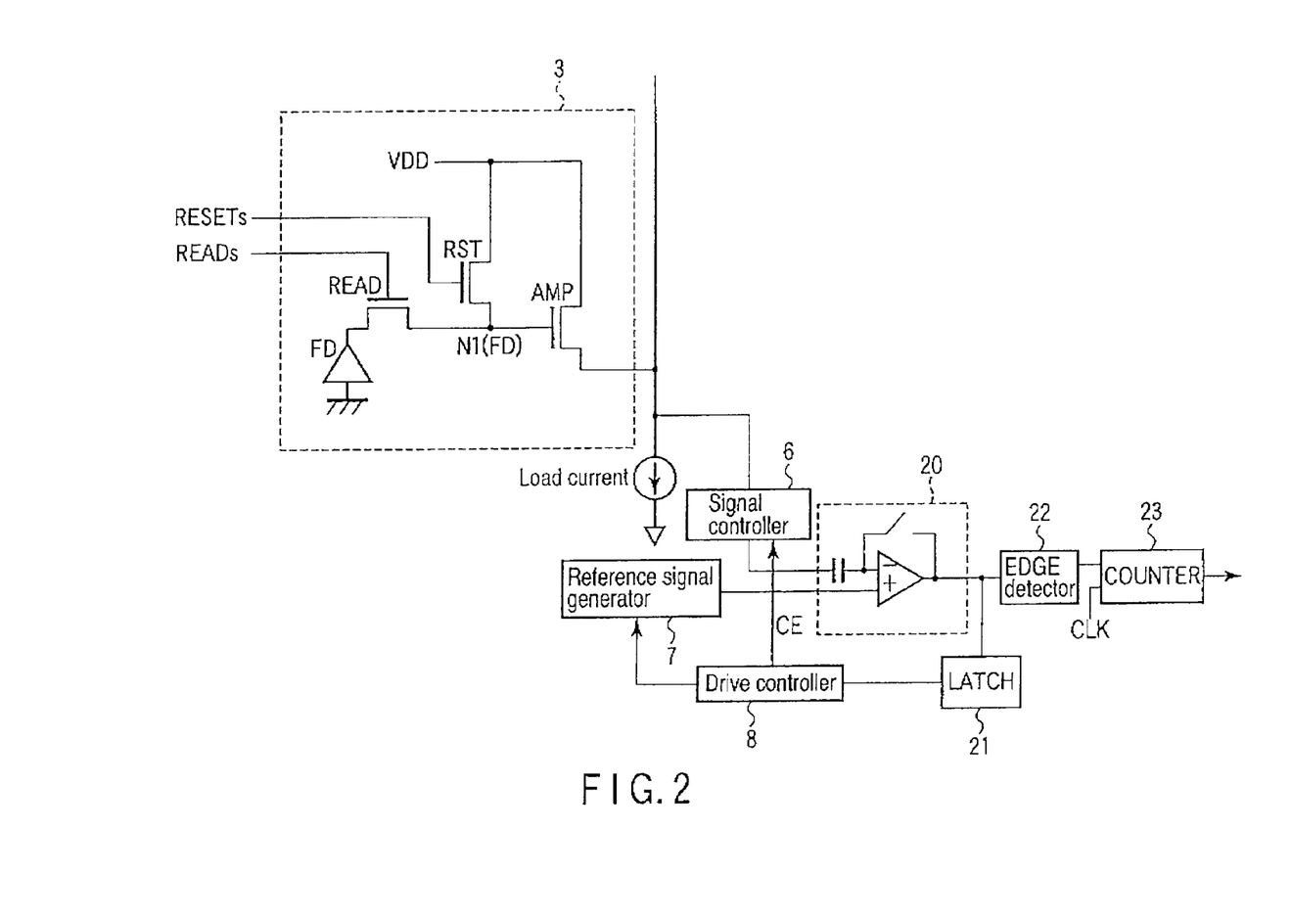
FIG. 2 is a block diagram corresponding to one column of the solid-state imaging device according to the first embodiment.

Next, a configuration example of the above-described pixel 3 will be described with reference to FIG. 2. FIG. 2 illustrates an example of a circuit of the pixel 3 arranged on an sth row (1≤s≤t) and connected to the vertical signal line VSL1, for example. As illustrated in FIG. 2, the pixel 3 includes MOS transistors RST, READ, and AMP and a photodiode PD.

A signal RESETs is applied from the row scanning circuit 4 to a gaze of MOS transistor RST as signal LS, a voltage VDD is supplied to a drain terminal thereof, and a source terminal thereof is connected to the connection node N1. MOS transistor RST serves as a reset transistor. That is, when MOS transistor RST is turned on, potential of the node N1 (diffusion: detector) is reset.

A signal READS supplied from the row scanning circuit 4 is applied to a gate of MOS transistor READ, a drain terminal thereof is connected to the connection node N1, and a source terminal thereof is connected to a cathode of the photodiode PD. MOS transistor READ serves as a signal charge reading transistor. An anode of the photodiode PD is grounded.

The connection node N1 is connected to a gate of MOS transistor AMP, voltage VDD is supplied to a drain terminal thereof, and a source terminal thereof is connected to the vertical signal line VSL1. That is, the gate of MOS transistor AMP, the source terminal of MOS transistor RST, and the drain terminal of MOS transistor READ are connected in common by the connection node N1. That is, MOS transistor AMP is configured to amplify a signal at the node N1 to output to the vertical signal line VSL1. Also, FIG. 2 is a block diagram corresponding to one column in which the pixel signal enters the comparator through the reset signal controller 6 and is compared with the reference voltage VREF.

Meanwhile, the signal lines, which transmit signal RESETs and signal READs, are connected in common by the unit pixels 3 arranged on an sth line in a horizontal direction orthogonal to the vertical signal line VSL. That is, the signal lines are the sth line in the horizontal direction orthogonal to the vertical signal line VSL and are connected in common to the unit pixels 3 connected to each of the vertical signal lines VSL1 to VLSm.

Also, the above-described unit pixels 3 arranged on the same column are connected in common to any of the vertical signal lines VSL1 to VSLm through the source terminal of MOS transistor AMP.

The signal of any of signals RESET1 to RESET(k+t) and signals READ1 to READ(k+t) is applied in common to the unit pixels 3 on the same row. Hereinafter, when signals RESET1 to RESET(k+t) and signals READ1 to READ(k+t) are not distinguished from each other, they are also simply referred to as signals RESET and signals READ.

<3. Counter Value of Reset Signal when Gain of Reference Signal VREF is Changed>

Figure 3:
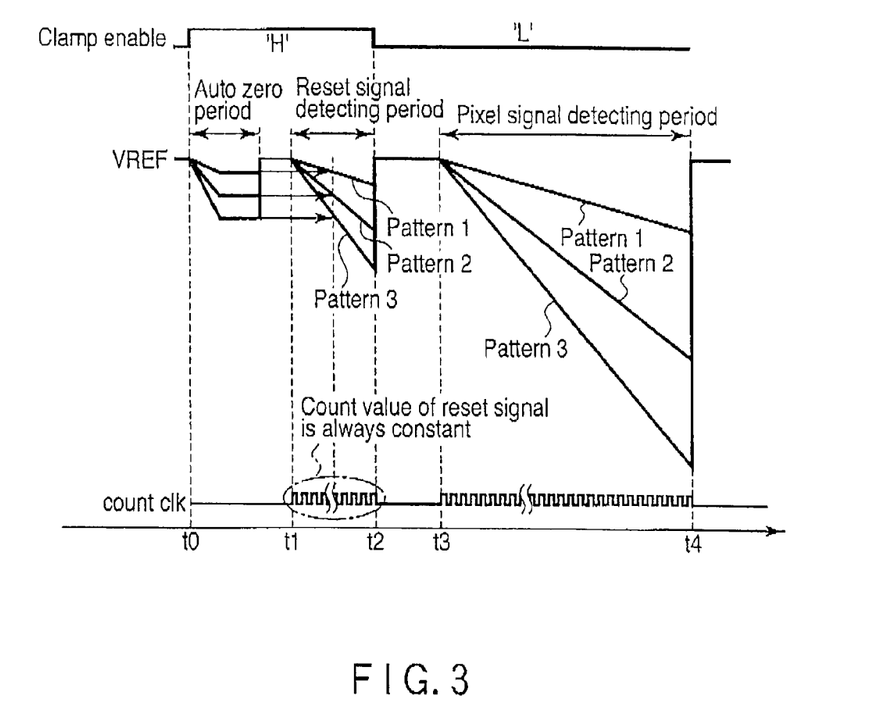
FIG. 3 is a schematic diagram illustrating relationship between a gain of a reference signal VREF and a count clock according to the first embodiment.

Next, a count value (digital signal) output by the counter 23 when performing analog/digital conversion to the analog signal Vsig (reset signal) will be described with reference to FIG. 3. FIG. 3 is a schematic diagram illustrating relationship between a gain of the reference signal VREF generated by the above-described reference signal generator 7 and a count clock output by the counter 23.

As illustrated in FIG. 3, the reference signal VREF generated by the reference signal generator 7 has inclinations of patterns 1 to 3, for example. The solid-state imaging device according to this embodiment may set the count value output by the counter 23 to a target value (digital target value) even when the inclinations of the reference signal VREF differ from each other. This is because it is determined not by the voltage of 1 LSB but by the counted digital value.

A reset full count number is determined for the digital target value of the reset signal such that variation falls within a reset full count value corresponding to count time of the reset signal in consideration of noise of MOS transistor AMP of the pixel 3 and offset and delay of the comparator 20. That is, the inclination of the reference signal VREF as the pattern 1 is smaller than that of the pattern 3 as illustrated in the drawing. In this case, when comparing the reset signal by the comparator 20, there is a tendency that the count value (digital value) varies (in some cases, the reset signal does not fall within the range of the analog-to-digital conversion and is larger than the full count value). Then, signal CE is made high in the auto-zero period and the reset signal detection period. According to this, the digital signal of the reset signal may be obtained even with the reference signal VREF having the gain like the pattern 1, that is to say, when the count value varies.

This will be described with reference to FIG. 3, for example. As illustrated in FIG. 3, in this embodiment, when an output target value of the reset signal is set to 128 LSB, for example, and the full count range of the reset signal is set to 256 LSB, the output of the counter 23 in the reset signal detection period falls within the count range even when the variation from the output target value of the reset signal is taken into account.

Meanwhile, the magnitude of the gain changes depending on a shooting scene of an image sensor, for example. That is, the gain is increased when shooting in dark, and on the other hand, the gain is decreased in a bright scene and the like. In this manner, the gain of the reference voltage VREF is changed.

<2-1. Operation of Drive Controller 8>

Figure 4A:
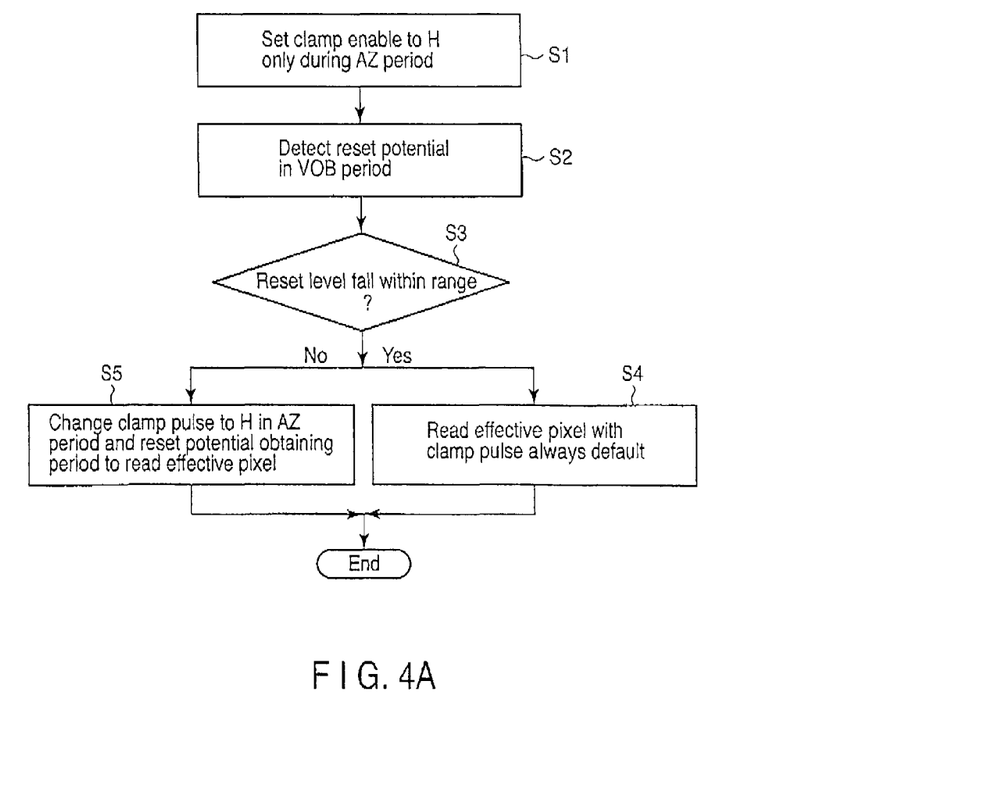
FIG. 4A is a flowchart illustrating operation of a drive controller according to the first embodiment.

Next, operation of the above-described drive controller 8 will be described with reference to FIG. 4A. FIG. 4A is a flowchart in which the drive controller 8 sets a clamp period according to reset potential output from the VOB region. The drive controller 8 first makes signal CE high only in the auto-zero period as an initial value (step S1). Next, the drive controller 8 detects the latch signal (determination signal) supplied from the latch circuit 21 (S2). As a result of step S2, when the digital conversion result of the reset signal falls within the reset full count value, that is to say, when the conversion result goes low (S3, YES), it is controlled such that signal CE is made high only in the auto-zero period (S4). On the other hand, when the conversion result is not inverted to the 'low' level and remains high at step S3 (S3, NO), the drive controller 8 controls to make signal CE high during the reset period in addition to the auto-zero period (S5).

<2-2. Reading Operation of Solid-State Imaging Device 1 in Bright Time>

Figure 4B:
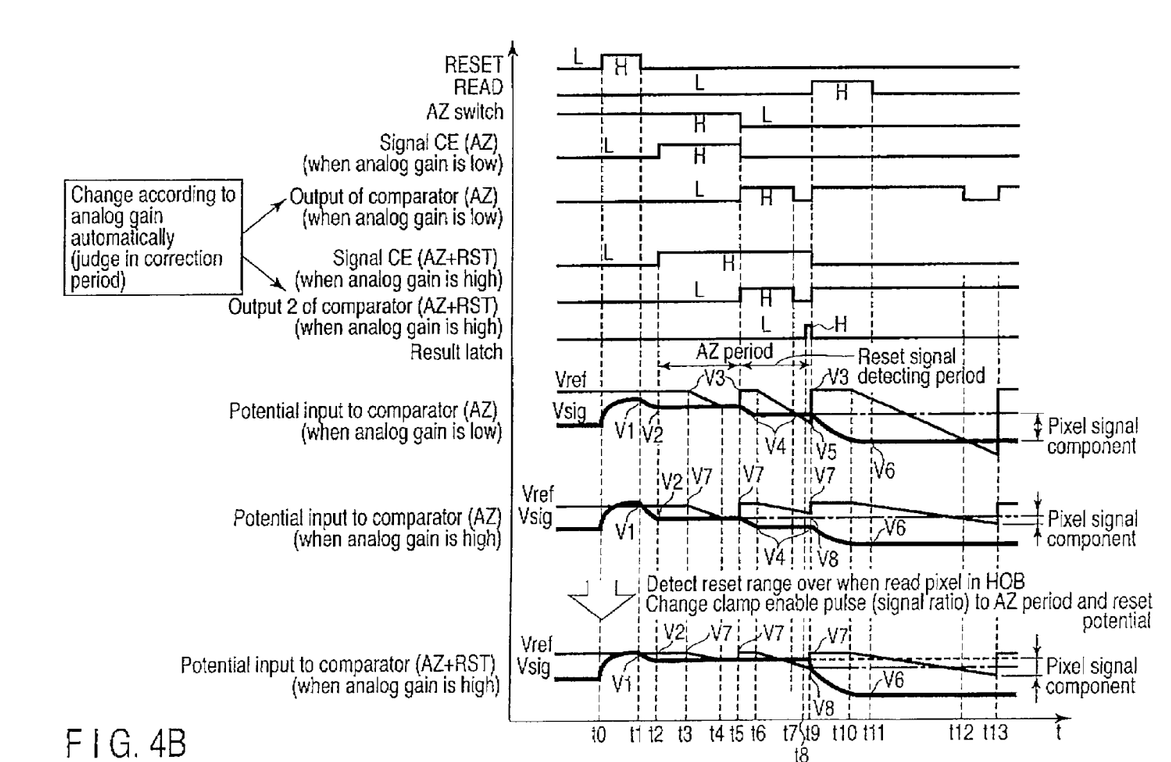
FIG. 4B is a timing chart and a potential chart illustrating how the solid-state imaging device according to the first embodiment operates in bright time.

Next, reading operation of the above-described solid-state imaging device 1 will be described with reference to FIG. 4B. FIG. 4B is a timing chart and a potential chart illustrating the period in which signal CE is made high is changed according to the digital conversion result of the reset signal read from the pixel 3 in the VOB region in bright time. Specifically, the period in which signal CE is made high is set to any of the auto-zero period (indicated as AZ period or AZ in the drawing) or the auto-zero period and the reset period (indicated as AZ+RST period in the drawing) according to the digital conversion result of the reset signal read from the pixel 3 in the VOB region. Meanwhile, when reading the reset signal read from the pixel 3 in the VOB region, default (initial setting) of the period in which signal CE is made high is only the auto-zero period (AZ period).

As illustrated in the drawing, the CE signal (AZ), the CE signal (AZ+RST), signal RESET, signal READ, an AZ switch and outputs from comparator 20 (AZ: when the gain is high), output 2 (AZ+RST: when the gain is low), a result latch, and the signal input to the comparator 20 (reference signal VREF, voltage Vsig of vertical signal line VSL) are represented along an ordinate axis and time is represented along an abscissa axis. Meanwhile, the CE signal (AZ), the output of the comparator 20 (AZ) and the voltage input to the comparator 20 (AZ) correspond to one another, and the CE signal (AZ+RST), the output of the comparator 20 (AZ+RST), and the voltage input to the comparator 20 (AZ+RST) correspond to one another. Meanwhile, in order to facilitate understanding of the timing chart, there will be also described operation when the period in which the drive controller 8 makes signal CE high is only the AZ period even though the analog gain is high (refer to the second chart from the bottom of the timing chart).

At time t0, signal RESET is made high. According to this, the reset signal read from the pixel 3 in the effective imaging region is read to the vertical signal line VSL. According to this, the potential of the vertical signal line VSL decreases at time t1.

Then at time t2, signal CE is made high. According to this, the reset signal controller 6 supplies a predetermined voltage (>reset voltage) to the vertical signal line VSL. Therefore, the potential of the vertical signal line VSL, which decreases, is fixed at V2 (<voltage V1) at time t2. If the incident light is too much, the potential of the reset signal decreases unless the reset signal controller 6 clamps the vertical signal line VSL. That is, the reference potential of the image signal to be obtained later is set to be low. Therefore, the dynamic range of the image signal becomes smaller.

Next, in a period from time t3 to time t4, the reference signal generator 7 decreases the reference signal VREF1 from a voltage V3 at a constant inclination. Then, the VREF signal value is fixed at an auto-zero signal value, and the reference potential of the comparator 20 is thus obtained.

Also, at time t5, the CDS period is made low. That is, the digital conversion is started at time t5. That is, after time t5, a high or low signal is output from the comparator 20.

Hereinafter, the timing chart after time t5 will be described while being separated to a case in which the gain is low and a case in which the gain is high.

<When Gain of Reference Signal VREF is Low>

First, clamp signal CE is set as a default (in the auto-zero period only), and a reset potential of an HOB pixel is read. When the gain of reference signal VREF is Low, the possibility which the digital conversion result of the reset signal falls within the reset full count value is high.

Prior to the reading of effective pixels, At time t5, clamp signal CE is made low, because the default setting of clamp signal CE is a logical high during the auto-zero period only. That is, the potential of the vertical signal line VSL fixed at voltage V2 decreases at time t5. Also, at the same time t5, the reference signal generator 7 switches from voltage V2 to voltage V3 and supplies voltage V3 to the comparator 20. As described above, since voltage V3>voltage V2, the comparator 20 outputs a high signal.

Then in a period from time t6 to time t9, the reference signal generator 7 decreases the reference signal VREF2 from voltage V3 at a constant inclination. From time t6, the counter 23 counts a clock signal CLK during the high period. According to this, the count value of the reset signal may be obtained.

When the gain of reference signal VREF is low, the inclination of reference signal VREF is large. Therefore, at time t7 during this period, the comparator 20 is very likely to be inverted owing to the potential identical to that of the vertical signal line VSL. At this time, the counter 23 finishes counting the reset signal and at that point, the comparator 20 is made low.

Then, since the reference signal VREF2<the vertical signal line VSL (Vsig) in a period from time t7 to t9, the comparator 20 outputs a low signal during this period. Meanwhile, the reference signal VREF 2 at time t9 is set to a voltage V5 (<V4).

Then, at t8 just before the reset full count, it is determined whether the comparator 20 is inverted. A latch signal determination pulse is output when the comparator 20 goes low, and the latch signal is not output when the comparator 20 is not inverted (not low). The latch signal is transmitted to the drive controller 8.

Also, at the point at which the comparator 20 is inverted, that is to say, at the point at which the EDGE detector 22 detects a low, the count value is determined and the digital value of the reset signal is stored (latched) in the counter 23.

In this manner, count of the clock signal CLK by the counter 23 is completed. Thereafter, after the digital value of the reset signal is determined, the counter 23 returns the reference signal VREF to voltage V3 and returns the comparator 20 to its original non-inverted state.

Then, the signals of all bits of the counter 23 are inverted and the reset count is set to a negative reset count value, and the count value is set as a count initial value.

Also, at time t9, a high signal READ is input to the pixel 3 in the effective imaging region. According to this, the voltage corresponding to the reset signal+the pixel signal is read to the vertical signal line VSL. As a result, at time t9, when the pixel signal is read to the vertical signal line VSL, the potential of the vertical signal line VSL decreases.

Also, at the same time t9, the reference signal generator 7 supplies the reference signal VREF3 of voltage V3 to the comparator 20 as the reference signal VREF. Since voltage V3>voltage V4 at time t9, the comparator 20 output is high.

Then, in a period from time t10 to time t13, the reference signal generator 7 decreases the reference signal VREF3 from voltage V3 at a constant inclination. From time t10, the counter 23 counts the clock signal CLK during the high period. According to this, the digital value of (reset signal+image signal) may be obtained.

Then, at time t11, signal READ input to the pixel 3 is made low. According to this, the reading from the pixel 3 to the vertical signal line VSL is completed and the potential of the vertical signal line VSL is set to V6 (<V5).

Then, at time t12, voltage input to the comparator 20 becomes the potential identical to the potential of the vertical signal line VSL. At this time, the counter 23 finishes the count of (reset signal+image signal) and at that point, the comparator 20 is made low.

Then, the counter 23 may obtain the digital signal of a net image signal by obtaining difference between the count value of the obtained reset signal and the count value of (reset signal+image signal). That is, according to this, CDS is completed.

Then, since the reference signal VREF3<the vertical signal line VSL (Vsig) in a period from time t12 to t13, the comparator 20 outputs a low signal during this period.

Figure 4C:
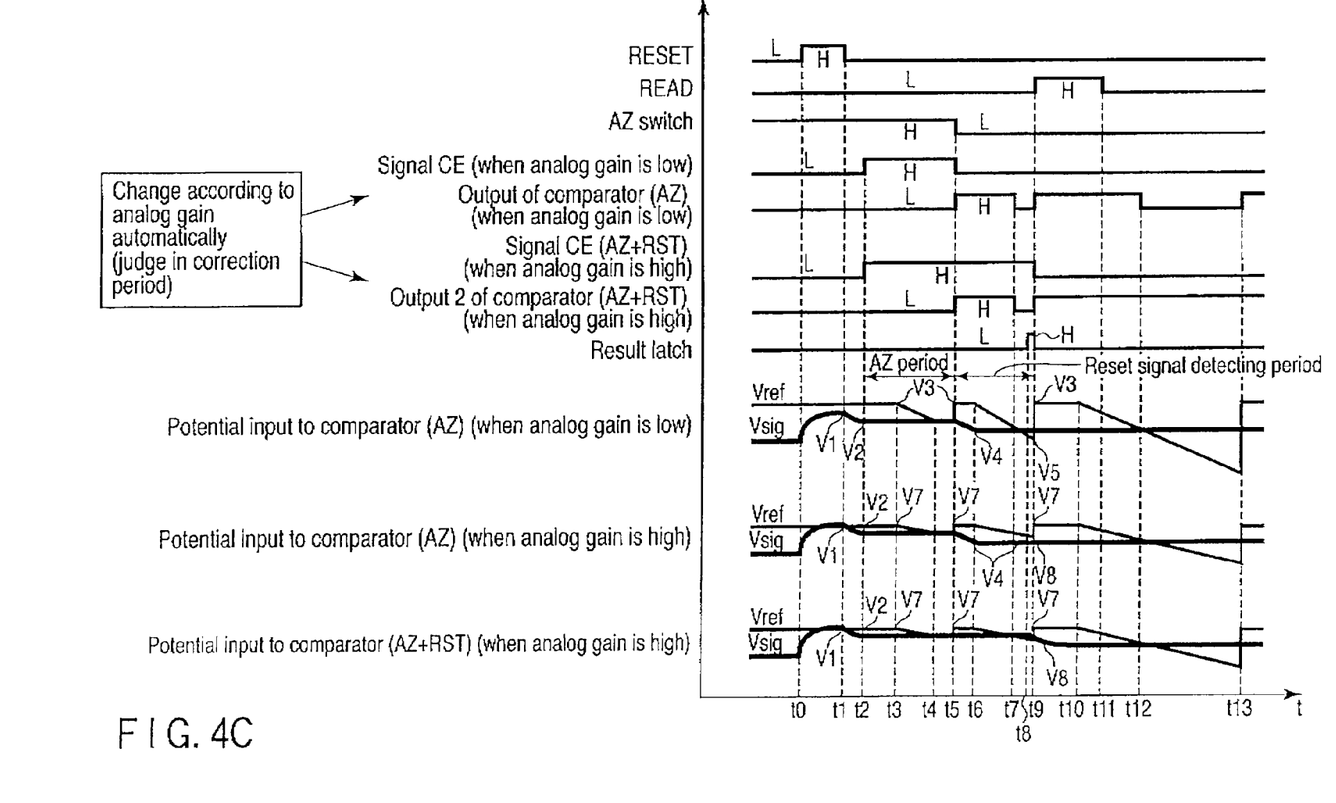
FIG. 4C is a timing chart and a potential chart illustrating how the solid-state imaging device according to the first embodiment operates in dark time.

FIG. 4C is a timing chart and a potential chart illustrating how the solid-state imaging device according to the first embodiment operates in dark time.

Since the operation in dark time is similar to that in bright time except that the pixel signal is minute (voltage of pixel signal=voltage of reset signal also after time t9), the description is omitted.

<When Gain of Reference Signal VREF is High>

Next, the case in which the gain of the reference VREF is high will be described. Meanwhile, the description of operation identical to that in the above-described case in which the gain is low is omitted.

First, clamp signal CE is set as a default (in the auto-zero period only), and a reset potential of an HOB pixel is read. When the gain of reference signal VREF is high, the inclination of reference signal VREF is small compared to the case where the gain is low. As shown in the second chart from the bottom, therefore, the potential at the vertical signal line VSL does not become lower than that of reference signal VREF. That is, the comparator 20 is not inverted, and the possibility of the full count is high.

The above indicates that the reset level does not fall within the digital level range. If information representing that the comparator is not inverted is held in the latch circuit, the period in which clamp signal CE is a logical high is changed from the auto-zero period to the (auto-zero period+reset signal detection period), prior to the reading of effective pixels. In response to this, the potential at the time of obtaining the auto-zero becomes identical to the potential of the reset voltage. In other words, even when the analog gain is high, there is time when the potential of the vertical signal line VSL and the potential of reference signal VREF are equal to each other. At the time, the comparator 20 is at the low level, and a reset count value is determined. Since the reset count value and the pixel count value are determined, analog-to-digital conversion is thus enabled. In other words, the period in which the voltage of the vertical signal line VSL is clamped in accordance with the reset level signal of the HOB pixel is automatically set, and the reset count value is determined.

<2-2. Operation of Solid-State Imaging Device in Dark Time>

An operation of the solid-stage imaging device in dark time will be described with reference to FIG. 4C. The operation determines threshold Gth described below. In dark time, no pixel signal is output during the pixel signal detection period. In other words, the operation is an operation performed for unit pixels 3 arranged in the VOP region. A description of the operations similar to those described in connection with FIG. 4B is omitted.

As shown in FIG. 4C, clamp signal CE is set as a default (in the auto-zero period only), and a reset potential of the HOB pixel is read. If, in this case, a reset signal is determined, signal CE is made high in the AZ period only, when effective pixels are read. On the other hand, if the reset signal is not determined, i.e., if the value is a full count value, and the reset level signal does not fall within the digital level range, signal CE is made high in the (AZ+RST) period. By so doing, the variations can be limited to the reset full count values.

If the period in which signal CE is made high is limited to the AZ period where the analog gain is high, the reset signal cannot be controlled to be within the analog-to-digital conversion range, and the value exceeds the full count value (i.e., the case where the potential [AZ] analog gain applied to the comparator is high). A description will be given of this state with reference to FIG. 4D.

Figure 4D:
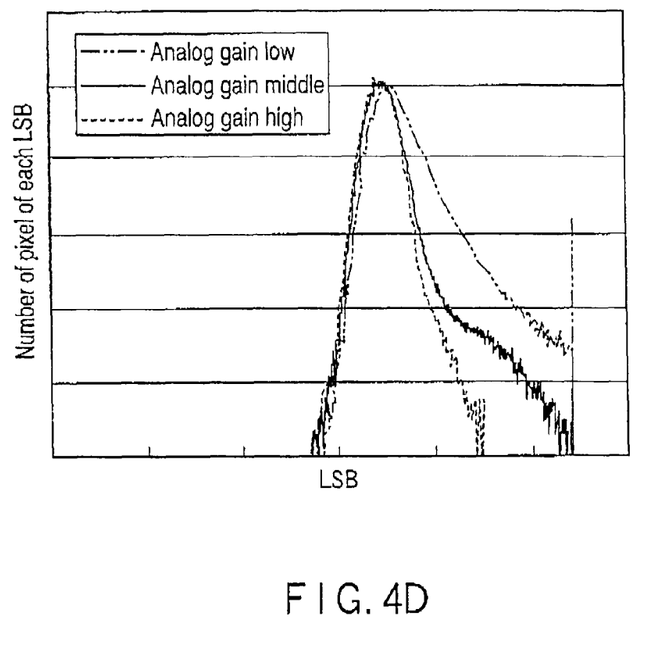
FIG. 4D is a schematic diagram illustrating how the count values of a reset signal varies in the case of different analog gains according to the first embodiment.

FIG. 4D shows variations in the count values (digital values) obtained by executing analog-to-digital conversion for the reset signals output from the unit pixels 3 of the VOB region. The number of pixels arranged in each LSB is plotted against the ordinate axis, and the LSBs are plotted against the abscissa axis. If the period in which signal CE is made high is limited to the AZ period where the analog gain is high, as shown in FIG. 4D, the reset signal cannot be controlled to be within the analog-to-digital conversion range, and the value exceeds the full count value of the LSBs. The voltage value of the analog gain obtained when the reset signal cannot be controlled to be within the analog-to-digital conversion range is used as gain Gth described below.

<Clamp Operation of Reset Signal Controller 6>

A description will be given of the case where the reset signal controller 6 described with reference to FIG. 4B fails to clamp the vertical signal line VSL. As described above, the reset signal controller 6 clamps the potential of the vertical signal line VSL so as to prevent the phenomenon in which a black and dark pattern is generated in the entire image.

If excessively intense light is incident, the reset signal controller 6 has to clamp the reset signals obtained during the AZ period. If not, the reset signal may decrease. Therefore, a sufficient dynamic range cannot be ensured for the pixel signals and the reference potentials of the pixel signals obtained during the auto-zero period. For this reason, a black and dark pattern may be generated in the entirety of the obtained image.

<Vertical Line Generation Margin>

Figure 5:
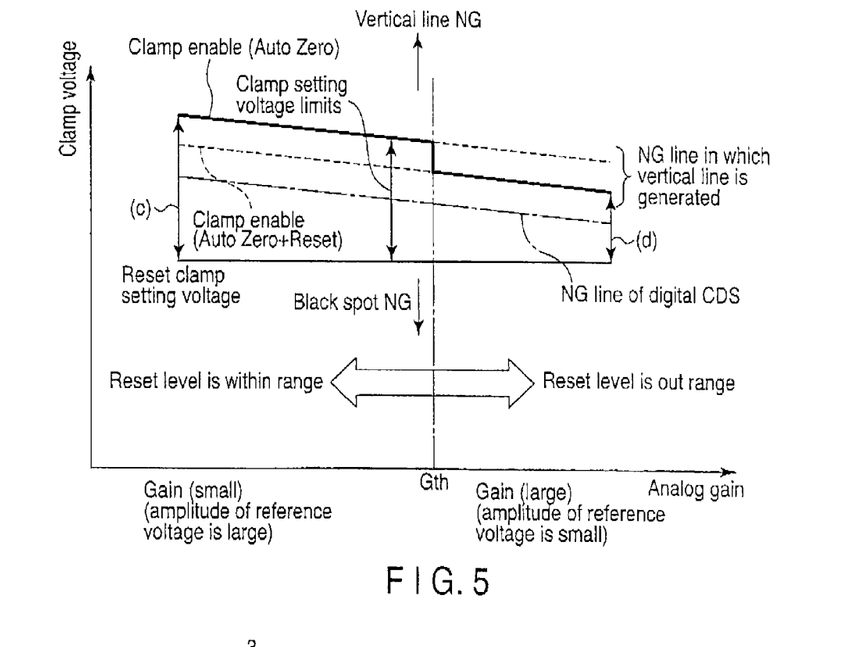
FIG. 5 is a schematic diagram illustrating a digital conversion possible region in the solid-state imaging device according to the first embodiment.

Next, a threshold of a vertical line generated according to the period in which signal CE is made high will be described with reference to FIG. 5. FIG. 5 is a schematic diagram illustrating, by the period of signal CE, whether the digital conversion of the reset signal and the pixel signal may be performed according to the magnitude of the gain of the reference signal VREF.

As illustrated in FIG. 5, the clamp voltage (potential of vertical signal line VSL) is represented along an ordinate axis and the gain of reference signal VREF is represented along an abscissa axis. Also, a value of a gain of a border between a region in which the digital conversion may be performed (indicated as a digital CDS possible region in the drawing) and a region in which the digital conversion cannot be performed (indicated as a digital CDS impossible region in the drawing) is set as gain Gth.

The region in which the analog gain is small (in the drawing, the region is indicated as a region in which the reset level is within the range) will be first described.

When the analog gain is a value smaller than the gain Gth (region on left side of gain Gth in the drawing), the amplitude of the reference signal VREF is large in value. In this case, even if signal CE is made high only in the auto-zero period, the digital conversion of the reset signal may be performed in the reset signal detection period. That is, since the inclination of the reference signal VREF is large (gain is small), more analog values of the reset signal may be obtained as compared to the case in which the gain is large in the reset signal detection period as described with reference to FIG. 4, so that original reset potential without being clamped may be obtained. That is, when performing digital CDS, which obtains difference between the digital value of the reset signal and the digital value of (reset signal+pixel signal), the original reset potential without being clamped is obtained when obtaining the reset potential, so that correct reset potential cancel may be performed and the generation of the vertical line becomes difficult.

In particular, in the dark time, since the pixel signal is not output from the pixel 3, as shown in FIG. 4C, the potential of the vertical signal line VSL is set as the reset signal=the pixel signal. That is, in the dark time, since the original reset potential without being clamped is obtained in the reset signal detection period and the reset signal substantially equivalent is obtained also in the pixel signal detection period, correct reset potential CDS cancel is performed, so that the generation of the vertical line becomes difficult and dark time noise decreases.

According to this, a vertical line generation NG line increases in a left direction (indicated by a bold line in the drawing). Therefore, a margin of the clamp voltage (vertical line generation margin) may be made larger relative to the reset clamp voltage (indicated as C in the drawing).

Next, the region in which the analog gain is large (in the drawing, the region is indicated as a region in which the reset level is outside the range) will be described.

When the analog gain is a value larger than the gain Gth (region on right side of gain G1 in the drawing), the amplitude of the reference signal VREF is small as compared with the above-described case. This is the region in which the digital conversion of the reset signal cannot be performed in many cases.

Thus, signal CE is made high in both of the auto-zero period and the reset signal detection period. As a result, although the margin (vertical line generation margin) of the clamp voltage becomes smaller relative to the reset clamp voltage as compared to the above-described case (indicated as D in the drawing), the digital conversion of the reset signal may be performed in the reset signal detection period. That is, although the inclination of the reference signal VREF is small, by making the period in which signal CE is made high longer than that in the above-described case, the digital conversion of the reset signal may be performed in the reset signal detection period. That is, the generation of the vertical line becomes difficult when performing the digital CDS also in this case.

Meanwhile, a clamp setting voltage (indicated as a voltage within the clamp setting voltage range in the drawing) needs to be set to a voltage which satisfies the following condition. When the setting voltage is decreased, especially in the bright time, the dynamic range of the reference potential of the comparator 20 (reference potential of pixel signal) and the pixel signal becomes narrow. When the clamp voltage is set to the high voltage in order to avoid this, an error from the original reset potential becomes large and a difference between a clamped reset level when obtaining the reset potential and an original reset level when obtaining pixel potential is generated. According to this, it is required to set the clamp setting voltage to an optimal voltage which satisfies the above-described condition.

<Effect According to this Embodiment>

The solid-state imaging device according to this embodiment may obtain the following effect (1).

(1) The generation of the vertical line is prevented and the properties in the dark time may be especially improved. The solid-state imaging device according to this embodiment includes the latch circuit 21 and the drive controller 8 for setting length of signal CE according to the determination flag supplied from the latch circuit 21. That is, as described above, the latch circuit 21 sets the period in which signal CE is made high, by the determination flag of whether the digital conversion of the reset signal read from the pixel 3 in the correction imaging region (VOB) is performed. According to this, the period in which signal CE is made high may be automatically adjusted when reading the analog signal (reset signal, pixel signal) from the pixel 3 in the effective imaging region in conjunction with the gain of the reference signal VREF. In other words, an optimal period for the reference signal VREF (only auto-zero period or auto-zero period and reset period) may be set.

According to this, the region in which the digital CDS may be performed and the region in which this cannot be performed (refer to FIG. 5) may be determined by the reset signal of the pixel 3 in the VOB region to set the optimal period of signal CE, the vertical line is inhibited, and the dark time properties are especially improved.

Also, the drive controller 8 may set the length of signal CE using a latch result supplied from a plurality of unit pixels 3. That is, by mounting the program circuit for determining the number on the drive controller 8, the sensor timing optimal for the analog gain may be transmitted in the effective pixel reading period with the high degree of accuracy.

Second Embodiment

Next, a solid-state imaging device 1 according to a second embodiment of the present embodiment will be described. Although it is determined by whether the comparator 20 is inverted in the first embodiment, it is determined by whether a count value (analog-to-digital conversion value) output from a counter 23 falls within a threshold set in advance by a counter value determination circuit 24 in the second embodiment. Specifically, the counter value determination circuit 24 is allowed to hold in advance an analog-to-digital conversion level of a reset signal read from a pixel 3 in a correction imaging region and a period of signal CE to be made high is set according to whether the reset signal reaches the level. Hereinafter, a configuration of the solid-state imaging device 1 according to this embodiment will be described. Meanwhile, same reference numeral is assigned to a configuration identical to that of the above-described first embodiment.

<1. Configuration Example>

Figure 6:
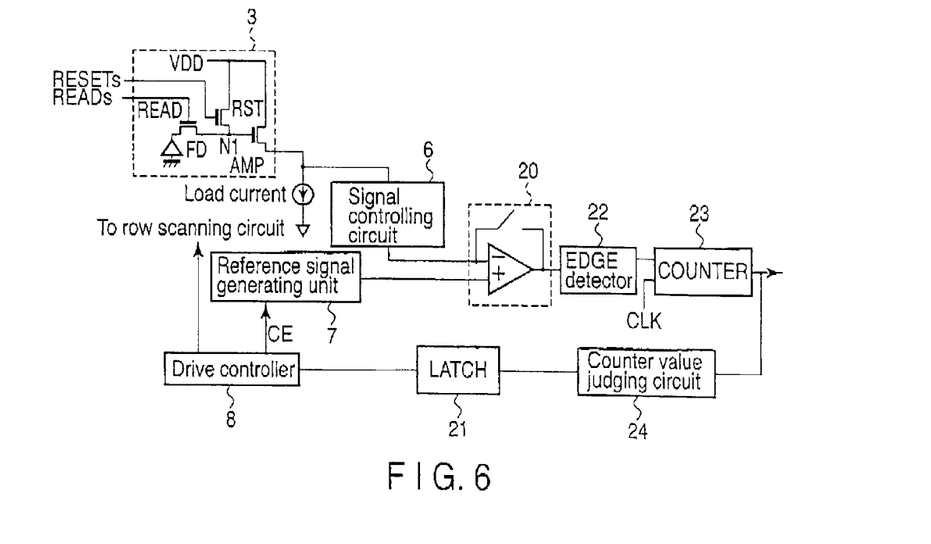
FIG. 6 is a block diagram corresponding to one column of a solid-state imaging device according to a second embodiment.

FIG. 6 is a block diagram of the solid-state imaging device 1 according to this embodiment. FIG. 6 is a block diagram focusing on the pixel 3 connected to an sth row of a specific vertical signal line VSL in FIG. 1. The solid-state imaging device 1 according to this embodiment has a configuration in which the counter value determination circuit 24 is provided on a subsequent stage of the counter 23 and a latch circuit 21 provided on a subsequent stage of the comparator 20 in the first embodiment is provided on a subsequent stage of the counter value determination circuit 24.

The counter value determination circuit 24 receives a count value (digital value) of the reset signal read from the pixel 3 in the VOB region from the counter 23. Then, the counter value determination circuit 24 determines whether the count value, that is to say, the analog-to-digital conversion level (LSB) reaches the threshold held by itself.

Then, the counter value determination circuit 24 supplies a determination flag to the latch circuit 21 on the subsequent stage. The latch circuit 21 holds a logical high or logical low according to the determination flag received from the counter value determination circuit 24. The drive controller 8 outputs a control signal which sets the period of signal CE to the reset signal controller 6 according to the logic level held by the latch circuit 21.

That is, an output target value of the reset signal is set to 128 LSB and a full count range of the reset signal is set to 256 LSB. In this case, the threshold of the counter determination circuit 24 is set to 220 LSB and it is determined whether the analog-to-digital conversion value of the reset signal of the correction pixel in a VOB becomes larger than 220 LSB. The determination result is fed back to the drive controller in the correction period and it is determined whether to change pulse timing of signal CE when reading the pixel 3 in the effective imaging region.

<Effect According to this Embodiment>

The solid-state imaging device according to this embodiment may also obtain the following effect (2) in addition to the above-described effect (1).

(2) It is possible to determine whether CDS may be performed before the reset full count, and the CDS may be necessarily performed.

The solid-state imaging device according to this embodiment allows the counter determination circuit 24 to hold the threshold (for example, 220 LSB) whether the CDS of the reset signal may be performed. This means that the determination whether the CDS may be performed is performed in the middle of a reset integration period as compared to the first embodiment. That is, it is possible to determine before the full count. When latch determination is performed in the full count, the pixel in which the CDS may be performed and the pixel in which the CDS cannot be performed are mixed; however, the CDS may be necessarily performed in the second embodiment and digital conversion of an analog signal Vsig read from the pixel 3 in the effective imaging region may be performed with a high degree of accuracy.

Third Embodiment

Next, a solid-state imaging device 1 according to a third embodiment of the present embodiment will be described. The solid-state imaging device 1 according to this embodiment has a configuration in which a counter value determination circuit 24 is removed and a bit value of a specific position is output from a counter 23 in the above-described second embodiment. That is, in the solid-state imaging device 1 according to this embodiment, whether the bit value of the specific position changes to logical 1, for example, in a count value counted by the counter 23 is determination reference to set a period of signal CE.

<1. Configuration Example>

Figure 7:
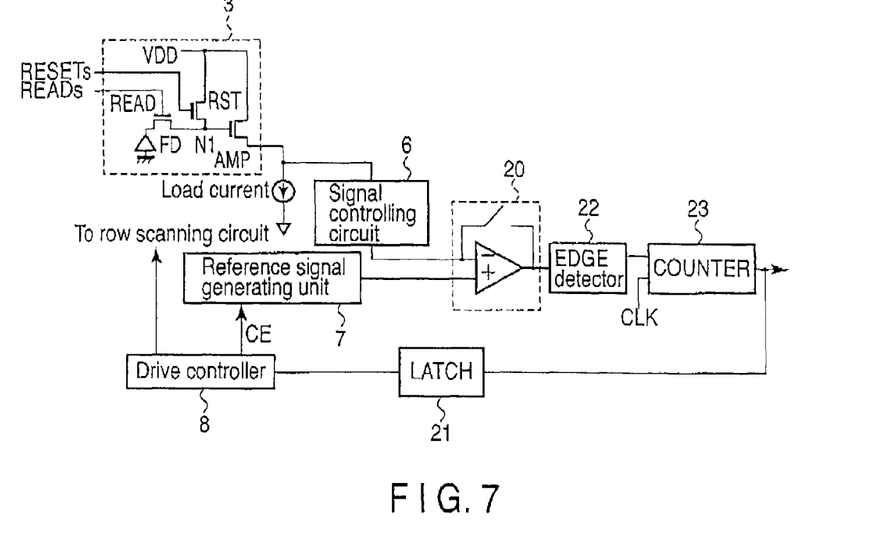
FIG. 7 is a block diagram corresponding to one column of a solid-state imaging device according to a third embodiment.

As illustrated in FIG. 7, the counter 23 outputs the bit value of the specific position to a latch circuit 21. Then, the latch circuit 21 receives the bit value of the specific position supplied from the counter 23 to output a low or high latch signal to a drive controller 8 according to a result. That is, when the bit value of the specific position monitored changes to logical 1, the latch circuit 21 outputs the latch signal (determination flag) to the drive controller 8. When receiving the latch signal, the drive controller 8 outputs signal CE made high only in an auto-zero period to a reset signal controller 6.

Figure 8:
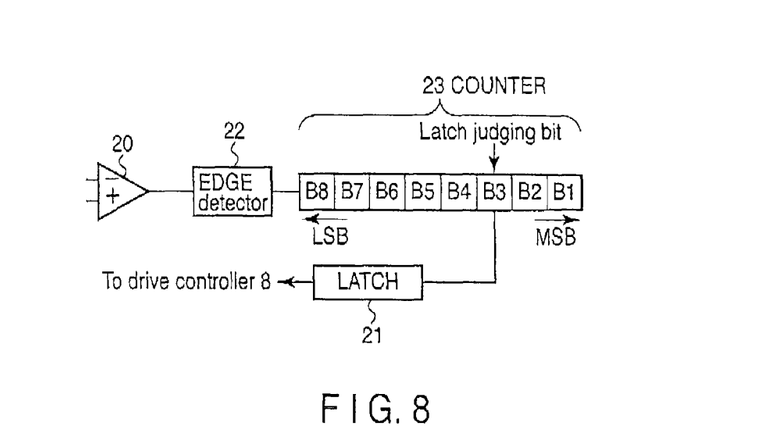
FIG. 8 is a block diagram of a counter according to the third embodiment.

A specific configuration example of the counter 23 according to this embodiment will be illustrated in FIG. 8. As illustrated in FIG. 8, the counter 23 is capable of holding 8-bit data, for example. Also, LSB indicates a value of a lowest significant bit held by the counter 23 and MSB indicates a value of a most significant bit held by the counter 23. Meanwhile, the counter 23 may have a configuration capable of holding more data not limited to 8-bit data.

Then, in the solid-state imaging device according to this embodiment, a value of a sixth bit from the lowest significant bit of the counter 23 (indicated as B3 in the drawing) is set as a latch determination bit, for example. When the value in B3 changes to logical 1, the latch circuit 21 outputs the determination flag corresponding to this to the drive controller 8.

<Effect According to this Embodiment>

The solid-state imaging device according to this embodiment may obtain the following effect (3) in addition to the above-described effects (1) and (2).

(3) Circuit size may be made smaller.

The solid-state imaging device according to this embodiment has a configuration in which the counter value determination circuit 24 is removed and the latch circuit 21 is provided on a subsequent stage of the counter 23. The latch circuit 21 has a configuration to which a bit number of the specific position output from the counter 23 is supplied.

That is, the solid-state imaging device according to this embodiment also has the configuration in which the latch circuit 21 may control the drive controller 8 according to the data from the counter 23 (herein, bit number). In other words, the solid-state imaging device according to this embodiment may automatically set a period to clamp a voltage of a vertical signal line VSL by the drive controller 8 while having a large margin, and further this may make the circuit size smaller. That is, a further effect may be obtained in addition to the effects (1) and (2). Therefore, a vertical line is suppressed and the properties in dark time may be improved.

Meanwhile, in the above-described first embodiment, the determination flag held by the latch circuit 21 determines the period of signal CE only by a reset signal of a correction pixel in a VOB (auto-zero period, or the auto-zero period and a reset signal detection period), analog-to-digital conversion of a pixel signal in the VOB may be performed or may not performed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid-state imaging device comprising:
   a VOB region from which a reset signal is output to a vertical signal line;
   an effective pixel region from which the reset signal, used as a reference level of an image signal, and the image signal are output to the vertical signal line;
   a comparator comparing the reset signal transferred from the VOB region through the vertical signal line with a reference signal, and determining whether the reset signal is within a digital level range;
   a holder capable of holding either a value representing a first result or a value representing a second result, according to a determination result of the comparator; and
   a drive controller varying a pulse timing period in which a voltage of the vertical signal line is clamped, according to the value held by the holder, and automatically setting the period when the reset signal is read from the effective pixel region to the vertical signal line.

2. The device according to claim 1, wherein the pulse timing period in which the voltage of the vertical signal line is clamped by the drive controller is either an AZ period or an (AZ+RST) period longer than the AZ period.

3. The device according to claim 1, wherein an analog gain is controlled such that the reference signal has a large inclination when a large amount of light is incident on the effective pixel region and has a small inclination when a small amount of light is incident on the effective pixel region.

4. The device according to claim 2, further comprising:
m pixel units connected to t row selection lines (t is a natural number not smaller than 1) in the VOB region and outputting the reset signal to the vertical signal line,
wherein the first result indicates that an output of the comparator is inverted,
the second result indicates that an output of the comparator is not inverted, and
the drive controller determines the period as the (AZ+RST) period, based on a number of pixel units which are included in the m pixel units in the VOB region and whose reset signals are processed as representing the second result by the comparator.

5. The device according to claim 2, wherein:
the AZ period is a period in which a potential used as a reference potential of the comparator is obtained; and
the (AZ+RST) period includes the AZ period and also a period in which the reset signal is read to the vertical signal line and which ends immediately before the pixel signal is read.

6. The device according to claim 3, wherein the drive controller includes a determination circuit determining whether a count number has reached a predetermined value.

* * * * *